Dec. 20, 1960
L. A. COX
2,965,146
SCREW AND LOCK WASHER ASSEMBLY
Filed Oct. 24, 1956
2 Sheets-Sheet 1
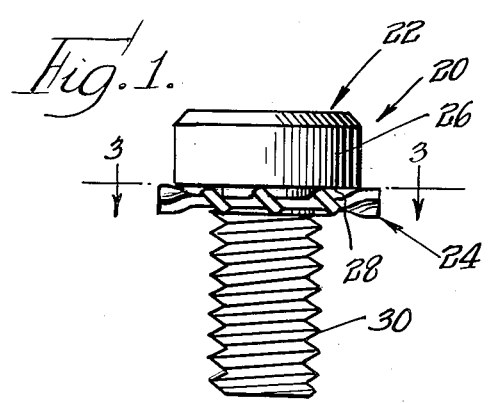
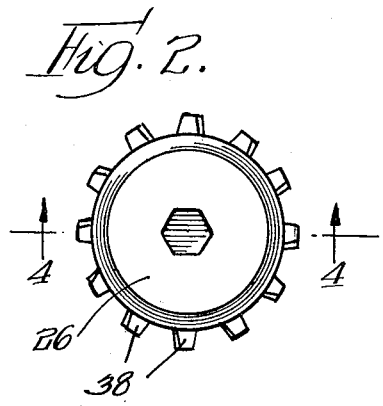
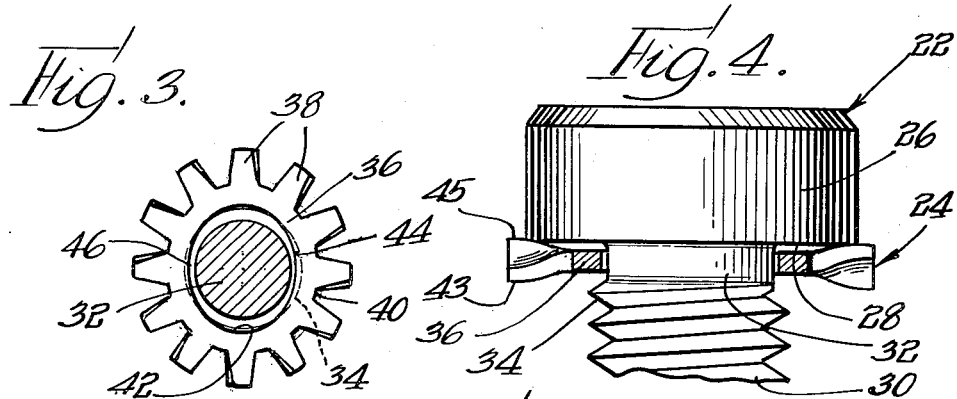
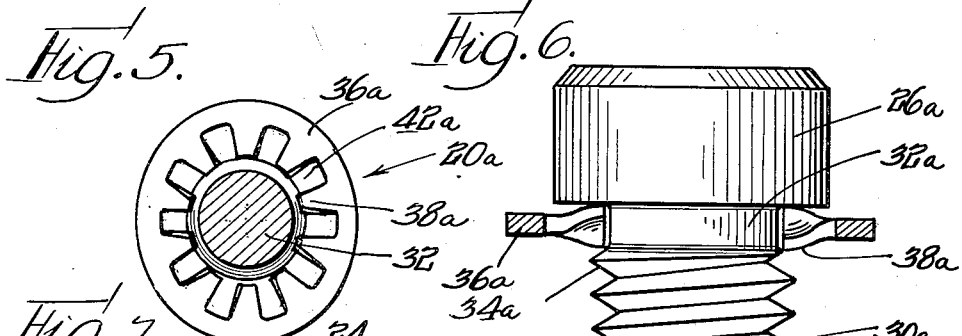
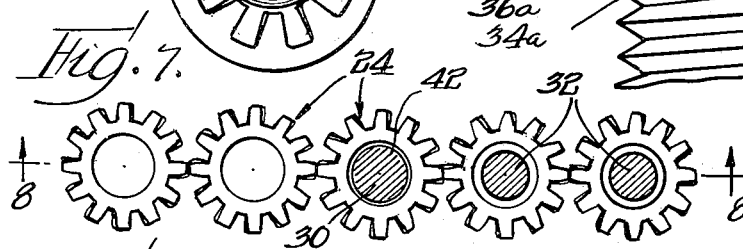
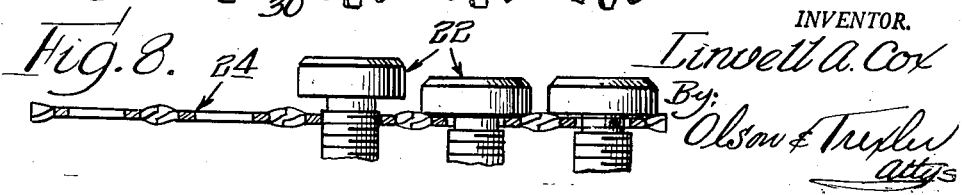
INVENTOR.
Linwell A. Cox
By:
Olson & Trexler
Attys

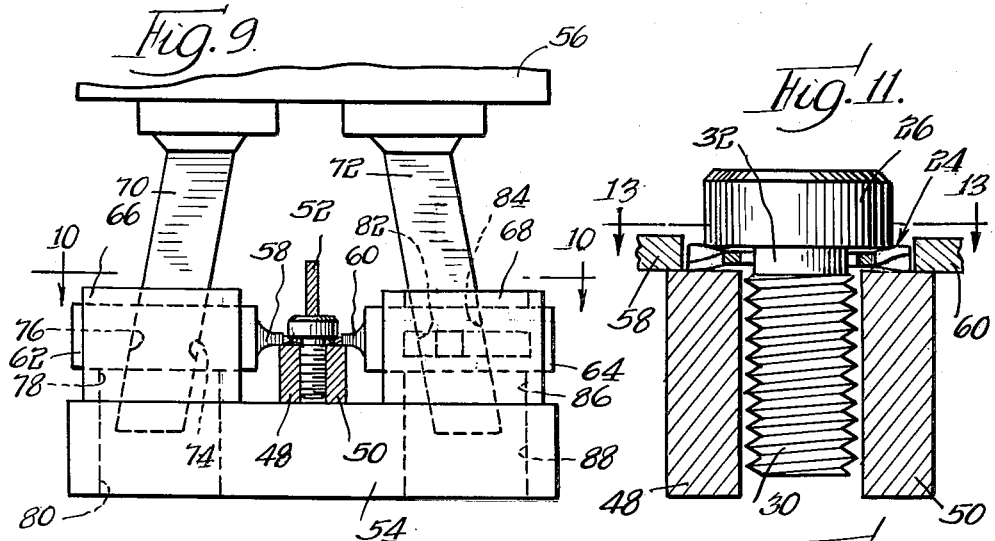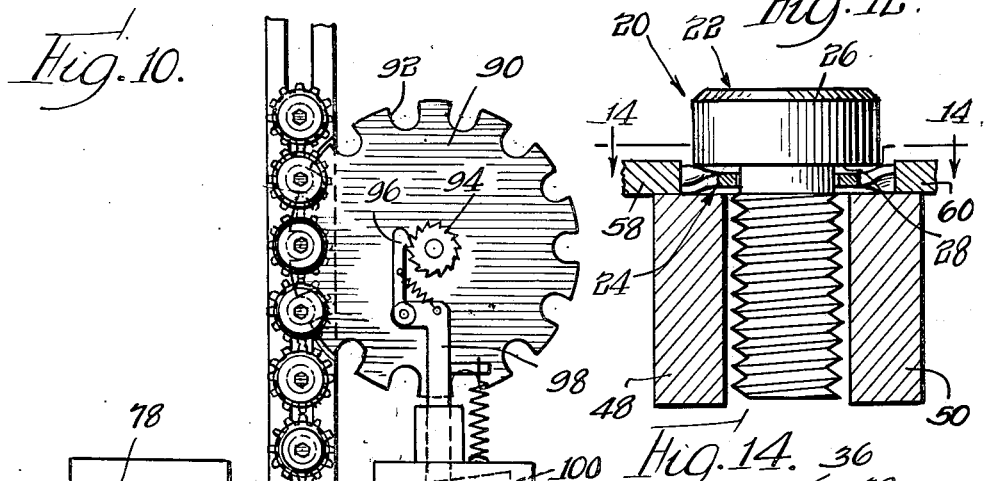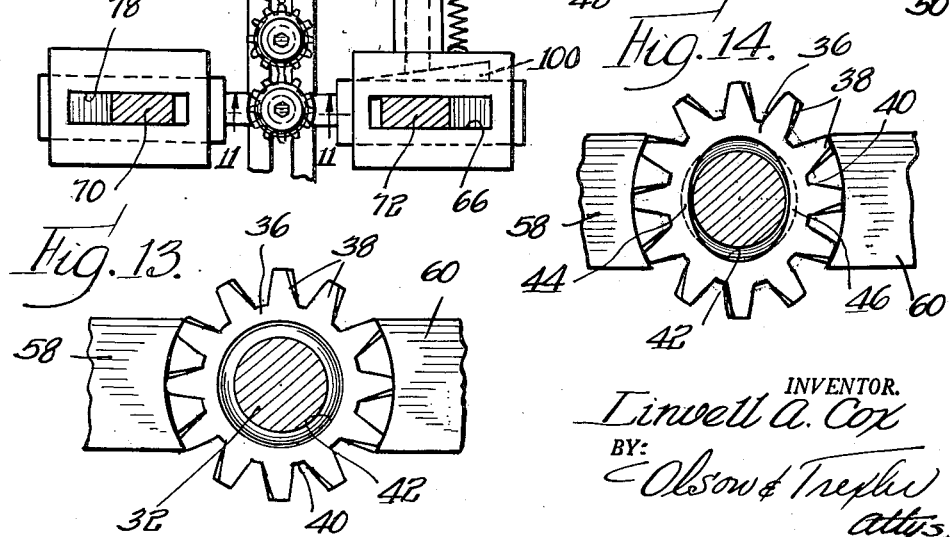

United States Patent Office 2,965,146
Patented Dec. 20, 1960

2,965,146

SCREW AND LOCK WASHER ASSEMBLY

Linvell A. Cox, Elgin, Ill., assignor to Illinois Tool Works, Chicago, Ill., a corporation of Illinois Filed Oct. 24, 1956, Ser. No. 618,144

3 Claims. (Cl. 151—37)

The present invention relates to a novel preassembled rotary fastener unit including a lock washer and a threaded fastener or nut, and more particularly to a novel method and apparatus for producing a novel rotary fastener unit.

An important object of the present invention is to provide a novel preassembled fastener unit including a lock washer and a fastener, which unit is constructed so that the washer and fastener may be substantially completely formed and then easily assembled with each other and secured in assembled relationship in a manner which locates locking or tooth edges of the washer at different distances from the axis of the fastener so as to minimize tracking of the tooth edges and which permits relative rotation between the fastener and the washer.

A more specific object of the present invention is to provide a novel preassembled fastener unit of the above described type which is constructed so that the lock washer may be easily and economically initially formed with a substantially true circular configuration and then applied to a finished threaded fastener whereupon the washer may be deformed so as to be permanently retained in assembled relationship with the fastener and so as to present locking tooth edges at different radial distances from the longitudinal axis of the fastener.

Another object of the present invention is to provide a novel method and apparatus for producing a preassembled fastener unit of the above described type, by which method and apparatus a circular tooth lock washer is provided with an internal diameter of sufficient size to enable a shank portion or the like of a fastener having abutment means thereon to be easily slipped into the washer until the abutment means underlies the washer, and finally the washer is cold worked and provided with a permanent set which locates a portion thereof for cooperative engagement with the abutment means to retain the washer and fastener in assembled relationship while permitting relative rotation between the elements and which reorientates locking tooth edges of the washer with respect to each other and a longitudinal axis of the fastener so that adjacent tooth edges are radially spaced different distances from the axis to minimize tracking of the edges.

Other objects and advantages of the present invention will become apparent from the following description and the accompanying drawings wherein:

Fig. 1 is an elevational view showing a fastener unit incorporating features of the present invention;

Fig. 2 is a top plan view of the fastener unit shown in Fig. 1;

Fig. 3 is a sectional view taken along line 3—3 in Fig. 1;

Fig. 4 is an enlarged fragmentary partial sectional view taken generally along line 4—4 in Fig. 2;

Fig. 5 is a sectional view similar to Fig. 3 but showing a modified form of the present invention;

Fig. 6 is a partial sectional view similar to Fig. 4 but showing the embodiment of Fig. 5;

Fig. 7 is a fragmentary plan view showing the first step in the assembly of the washers and screw members;

Fig. 8 is a sectional view taken along line 8—8 in Fig. 7;

Fig. 9 is a fragmentary elevational view partially in cross section and showing in simplified form an apparatus for producing the fastener units of the present invention;

Fig. 10 is a fragmentary sectional view taken along line 10—10 in Fig. 9;

Fig. 11 is an enlarged fragmentary sectional view taken along line 11—11 in Fig. 10 and showing a washer and fastener unit in position to be permanently secured in assembled relationship;

Fig. 12 is a sectional view similar to Fig. 11 but further showing the manner in which the washer is cold worked and set so that it is retained in assembled relationship with the fastener;

Fig. 13 is a sectional view taken along line 13—13 in Fig. 11; and

Fig. 14 is a sectional view taken along line 14—14 in Fig. 12.

Referring now more specifically to the drawings wherein like parts are designated by the same numerals throughout the various figures, a preassembled fastener unit 20 is shown in Figs. 1 through 4 and includes a threaded rotary fastener 22 such as a screw and a lock washer 24. The screw has a head 26 provided with a generally radially extending clamping face 28. A shank or stud portion extends axially from the clamping face which shank includes a threaded portion 30 having a predetermined outside diameter and a smooth or unthreaded section 32 immediately adjacent the clamping face having a diameter less than the outside diameter of the threaded section so that the uppermost thread convolution 34 which is axially spaced from the clamping face provides an abutment for the purpose described below.

The washer 24 includes a generally annular body section 36 of non-circular configuration as described more in detail below and a locking section provided by a plurality of circumferentially spaced prongs 38 projecting radially from a margin 40 of the body section. The prongs 38 project equal distances from the margin 40 so that the free marginal edge of the locking section defined by the terminal ends of the prongs has a non-circular configuration similar to the configuration of the body section 36. Furthermore, the prongs 38 are twisted uniformly about their radial axes so as to present tooth edges 43 and 45 at opposite sides of bounding planes of the body section 36. It is to be noted that as a result of the non-circular configuration of the washer body and locking sections, the locking edges of adjacent prongs are radially spaced different distances from the longitudinal axis of the fastener so as to minimize tracking of the locking edges when the fastener unit is applied to a workpiece which results in an approved locking action.

It is to be noted that the inner margin 42 of the washer body section and the margin 40 and the free margin of the locking section defined by the terminal ends of the prongs are of substantially identical configurations although, of course, the margins are of different sizes, and, more particularly, the margins have a generally oval configuration. The major axis of the oval margin 42 is greater than the diameter of the screw threads or the abutment means 34 provided by the uppermost screw thread, but it is to be noted that the minor axis of the oval margin 42 is less than the maximum diameter of the abutment means so that opposed marginal portions 44 and 46 of the washer body section overlie and cooperate with the abutment means to retain the fastener and washer in preassembled relationship. The minor axis of the oval margin 42 is slightly greater than the diameter of the smooth or unthreaded shank section 32 so that the washer is free for rotation relative to the fastener or screw.

In accordance with the method of the present invention, the fastener unit is produced by first completely forming and finishing the fastener or screw in accordance with known procedures and by forming the washer also in accordance with known procedures so that the washer initially has a substantially true circular configuration as shown in Fig. 7. Further, the washer is initially formed so that the inner margin 42 which is originally circular has a diameter greater than the outside diameter of the abutment means 34 on the screw. A plurality of the washers may be formed so that they are connected in a strip as shown in Figs. 7, 8 and 10 prior to assembly with fasteneres or screws, but it is to be understod that the method of this invention may be practiced when using washers which are separated prior to assembly with the fasteners.

After the fasteners or screws and the washers are formed in the manner described above, the washers are advanced along a path of travel and the screws are inserted into successive washers as illustrated in Fig. 8 by means, not shown, and it will be appreciated that this initial assembly of the screws with the washers may be accomplished easily since the circular apertures in the washers are of a size which is sufficient to enable the shanks of the fasteners to pass through the apertures without interference with the margins 42. The assembled washers and screws are then advanced between guide rails 48, 50 and 52 of an apparatus shown in simplified form in Figs. 9 through 14. This apparatus comprises a punch press having a fixed support block 54 and ram means 56 which is vertically reciprocated by any suitable means, not shown. At opposite sides of the guide rails 48 and 50 pinching or setting tools 58 and 60 are located, which tools are respectively reciprocably carried by cam members 62 and 64 slidably disposed in blocks 66 and 68 which are secured to the support 54. Cam bars 70 and 72 are secured to and depend from the ram means 56 and are respectively flared outwardly from the vertical axis of the ram means. The cam member or bar 70 extends through a slot in the cam member 62 and is slidably engageable with opposite inclined ends or cam surfaces 74 and 76 of the slot. Clearance slots 78 and 80 are provided in the bearing blocks 66 and 54. The cam member or bar 72 similarly extends into a slot in the cam member 64 and slidably engages inclined cam surfaces 82 and 84 defining opposite ends of this slot, and clearance slots 86 and 88 are provided in the blocks 68 and 54. With this arrangement it will be appreciated that when the ram means 56 is loweerd, the pinching or setting tools carried by the members 62 and 64 are moved together to pinch and set the washer as shown in Fig. 14, and when the ram is raised, the pinching or setting tools will be spread apart.

In accordance with the method of the present invention, the assemblies of a fastener or screw and circular washer are successively fed to a position between the pinching or setting dies. When an assembly is properly positioned between the tools as shown in Figs. 9 through 11 and 13, the ram is lowered so that the tools 58 and 60 engage circumferentially limited opposite portions of the washer and pinch or inwardly compress these portions until the inner margins engage the shank 32 of the fastener. This action causes cold working of the washer body section beyond its elastic limit so that it assumes and retains the oval configuration described above. It is to be noted that this cold working and setting of the washer may be accomplished even though the washer has been heat treated and hardened in accordance with the preferred practice prior to assembly with the screw. In order to insure proper cold working and setting of the washer body section without unduly increasing the original internal diameter of the washer or unduly decreasing the diameter of the fastener section 32, the radial extent or thickness of the washer body section is relatively small and is preferably substantially less than the radial extent of the washer locking section or prongs. It is to be noted that while the opposite portions of the washer body section may be pinched inwardly against the screw shank section 32, the resiliency of the washer material will be sufficient to cause these portions of the washer body section to spring back slightly so that the minor axis of the oval inner margin 42 will be greater than the diameter of the fastener shank section 32 as described above. Various means may be provided for feeding the assembled screw and washer units to the work station between and in timed relationship with the pinching or setting dies 58 and 60. In the embodiment shown for purposes of illustration, this feeding means includes a rotatably supported disk 90 projecting through a slot in the guide member 50 and having a plurality of circumferentially spaced notches 92 adapted to receive the shanks of the screw members. A ratchet wheel 94 is fixed on the shaft of the disk 90, which ratchet wheel is actuated intermittently to rotate the disk 90 and feed the assembled screw and washer units by a pawl 96 carried by a suitably mounted member 98. The member 98 is actuated in timed relationship with the movement of the pinching or setting dies by a cam member 100 fixed to the member 72 and extending through a slot in the bearing block 68 as shown in Fig. 10. With this arrangement, it is seen that each time the setting dies are spread apart during an upward stroke of the ram 56, the feeding disk 90 is rotated sufficiently to advance the assembled screw and washer units one step to locate a unit between the dies.

In Figs. 5 and 6, there is shown a modified form of the present invention which is similar to the above described preassembled unit as indicated by the application of identical reference numerals with the suffix "a" added to corresponding elements. This embodiment differs in that the locking section of the washer or, in other words, the prongs extend radially inwardly from the washer body section. It is to be understood that the free inner ends of the prongs 38a define the generally oval inner margin of the washer.

While the preferred embodiments of the present invention have been shown and described herein, it is obvious that many details may be changed without departing from the spirit and scope of the appended claims.

The invention is claimed as follows:

1. A preassembled fastener unit comprising a rotary fastener including a head with a generally radially extending clamping face and an externally threaded shank having an axial portion between the shank threads and the clamping face of a predetermined diameter less than the crest diameter of the shank threads with the adjacent thread surface providing abutment means spaced from the clamping face and projecting radially to a diameter greater than said predetermined diameter; and a lock washer including a generally annular body portion having one edge thereof presenting one margin of the washer and twisted locking teeth of substantially uniform length projecting radially from the body portion to present tooth edges disposed on opposite sides of the plane of the body portion and with the terminal ends of the teeth presenting the other margin of the washer, said lock washer being permanently deformed to present inner and outer margins of generally concentric elliptical configuration with an internal major transverse axis greater than the crest diameter of the shank threads and with an internal minor transverse axis less than the crest diameter of the threads and greater than the said predetermined diameter of the axial portion whereby the lock washer is rotatably retained in assembled relationship with the rotary fastener and with the tooth edges terminating at points differently spaced from a longitudinal axis of the fastener in order to minimize tracking between adjacent tooth edges during application of the fastening unit to a workpiece.

2. A preassembled fastener unit as claimed in claim 1, wherein said locking teeth extend radially outwardly from the body portion of the washer.

3. A preassembled fastener unit as claimed in claim 1, wherein the locking teeth extend radially inwardly from the body portion of the washer.

References Cited in the file of this patent

UNITED STATES PATENTS

| | | |
|---|---|---|
| 2,108,316 | Love | Feb. 15, 1938 |
| 2,250,050 | Olson | July 22, 1941 |
| 2,257,479 | Olson | Sept. 30, 1941 |
| 2,278,689 | Chilton | Apr. 7, 1942 |
| 2,311,299 | Olson | Feb. 16, 1943 |
| 2,578,217 | Anderson | Dec. 11, 1951 |
| 2,634,168 | Maxam | Apr. 7, 1953 |
| 2,707,012 | Cox | Apr. 26, 1955 |
| 2,715,929 | Knohl | Aug. 23, 1955 |